(12) United States Patent
Kwon et al.

(10) Patent No.: US 9,030,069 B2
(45) Date of Patent: May 12, 2015

(54) HYDRODYNAMIC BEARING ASSEMBLY AND SPINDLE MOTOR HAVING THE SAME

(71) Applicant: Samsung Electro-Mechanics Co., Ltd., Suwon, Gyunggi-do (KR)

(72) Inventors: Yong Il Kwon, Suwon (KR); Hyo Seok Lee, Suwon (KR); Ju Ho Kim, Suwon (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 201 days.

(21) Appl. No.: 13/742,846

(22) Filed: Jan. 16, 2013

(65) Prior Publication Data

US 2014/0009020 A1   Jan. 9, 2014

(30) Foreign Application Priority Data

Jul. 4, 2012   (KR) .......................... 10-2012-0073052

(51) Int. Cl.
| | |
|---|---|
| *F16C 32/06* | (2006.01) |
| *H02K 7/08* | (2006.01) |
| *F16C 17/10* | (2006.01) |
| *F16C 33/10* | (2006.01) |
| *H02K 5/167* | (2006.01) |

(52) U.S. Cl.
CPC ............. *F16C 32/0696* (2013.01); *H02K 7/08* (2013.01); *F16C 17/107* (2013.01); *F16C 33/107* (2013.01); *H02K 5/1675* (2013.01)

(58) Field of Classification Search
USPC .................................................. 310/67 R, 90
See application file for complete search history.

(56) References Cited

U.S. PATENT DOCUMENTS

| 6,657,343 | B2 * | 12/2003 | Ichiyama ..................... 310/90.5 |
| 2011/0051591 | A1 | 3/2011 | Yang | |
| 2012/0033905 | A1 | 2/2012 | Oh et al. | |
| 2014/0009020 | A1 * | 1/2014 | Kwon et al. .................... 310/90 |

FOREIGN PATENT DOCUMENTS

| JP | 2003-130042 | 5/2003 |
| JP | 2003-139130 | 5/2003 |
| JP | 2003-156035 | 5/2003 |
| JP | 2011-47439 | 3/2011 |
| KR | 1998-00030902 | 7/1998 |
| KR | 10-2012-0013629 | 2/2012 |

OTHER PUBLICATIONS

Korean Office Action issued on Jul. 28, 2013 in corresponding Korean Application No. 10-2012-0073052.
Japanese Office Action issued Oct. 1, 2013 in corresponding Japanese Patent Application No. 2013-003738.

* cited by examiner

*Primary Examiner* — Dang Le

(57) ABSTRACT

There is provided a hydrodynamic bearing assembly including: a shaft; a sleeve disposed to be spaced apart from the shaft by a predetermined interval to form a bearing clearance therewith; and a thrust member installed on the shaft, wherein at least one of the shaft, the sleeve, and the thrust member is provided with a dynamic pressure groove for generating fluid dynamic pressure in a lubricating fluid provided in the bearing clearance, and one side of a portion of the dynamic pressure groove into which the lubricating fluid is introduced is provided with a pressure reduction preventing groove for suppressing a reduction in pressure generated at the time of introduction of the lubricating fluid.

7 Claims, 6 Drawing Sheets

HYDRODYNAMIC BEARING ASSEMBLY AND SPINDLE MOTOR HAVING THE SAME

CROSS-REFERENCE TO RELATED APPLICATIONS

This application claims the priority of Korean Patent Application No. 10-2012-0073052 filed on Jul. 4, 2012, in the Korean Intellectual Property Office, the disclosure of which is incorporated herein by reference.

BACKGROUND OF THE INVENTION

1. Field of the Invention

The present invention relates to a hydrodynamic bearing assembly and a spindle motor having the same.

2. Description of the Related Art

A small spindle motor used in a hard disk drive (HDD) is generally provided with a dynamic pressure bearing apparatus, and a bearing clearance formed between a shaft and a sleeve included in the dynamic pressure bearing apparatus is filled with a lubricating fluid such as oil. The lubricating fluid provided in the bearing clearance as described above is pumped to generate fluid dynamic pressure, thereby rotatably supporting a rotating member.

That is, the dynamic pressure bearing apparatus is generally provided with a thrust dynamic pressure groove having a spiral shape or a journal dynamic pressure groove having a herringbone shape, both of which generate dynamic pressure to thereby promote stability in rotational driving of a motor.

Meanwhile, at the time of rotating the rotating member, the lubricating fluid is pumped while being introduced into the thrust dynamic pressure groove and the journal dynamic pressure groove as described above, thereby generating fluid dynamic pressure.

However, as described above, in the case that the lubricating fluid is introduced into the thrust dynamic pressure groove and the journal dynamic pressure groove, it is likely that an area of low pressure will be generated in a location at which the lubricating fluid is introduced. In addition, it is further likely that the area of low pressure will be generated in the location in which the lubricating fluid is introduced into the thrust dynamic pressure groove and the journal dynamic pressure groove disposed close to the surrounding air.

The area of low pressure generated as described above may cause cavitation (that is, a phenomenon in which cavities are formed within a liquid due to areas of low pressure therein), thereby deteriorating rotational characteristics.

RELATED ART DOCUMENT (Patent Document 1) Japanese Patent Laid-Open Publication No. 2011-47439

SUMMARY OF THE INVENTION

An aspect of the present invention provides a hydrodynamic bearing assembly capable of reducing cavitation and a spindle motor having the same.

According to an aspect of the present invention, there is provided a hydrodynamic bearing assembly including: a shaft; a sleeve disposed to be spaced apart from the shaft by a predetermined interval to form a bearing clearance therewith; and a thrust member installed on the shaft, wherein at least one of the shaft, the sleeve, and the thrust member is provided with a dynamic pressure groove for generating fluid dynamic pressure in a lubricating fluid provided in the bearing clearance, and one side of a portion of the dynamic pressure groove into which the lubricating fluid is introduced is provided with a pressure reduction preventing groove for suppressing a reduction in pressure generated at the time of introduction of the lubricating fluid.

The dynamic pressure groove may include upper and lower journal grooves formed in at least one of an outer peripheral surface of the shaft and an inner peripheral surface of the sleeve.

The upper and lower journal grooves may have a herringbone or spiral shape, and the pressure reduction preventing groove may be disposed to one side of a distal end portion of at least one of the upper and lower journal grooves in a direction opposite to a rotation direction of the shaft or the sleeve so that the lubricating fluid is introduced into the pressure reduction preventing groove before being introduced into the upper and lower journal grooves.

The pressure reduction preventing groove may include one or more pressure reduction preventing grooves disposed to be spaced apart from each other in the direction opposite to the rotation direction of the shaft or the sleeve.

One end of the pressure reduction preventing groove and one end of the upper and lower journal grooves may be commonly disposed on an extension line extended from one end of the upper and lower journal grooves in a circumferential direction.

The pressure reduction preventing groove may be disposed in parallel with the upper and lower journal grooves.

The one or more pressure reduction preventing grooves may decrease in size in a direction away from the upper and lower journal grooves.

The pressure reduction preventing groove may have acute distal ends and widen in a central portion thereof.

Both distal ends of the pressure reduction preventing groove may have a shape equal to or more acute than that of distal ends of the upper and lower journal grooves.

The dynamic pressure groove may include a thrust groove providing force in an axial direction, the thrust groove being formed in at least one of the thrust member and the sleeve.

The thrust groove may have a herringbone or spiral shape, and the pressure reduction preventing groove may be disposed to one side of a distal end portion of the thrust groove in a direction opposite to a rotation direction of the shaft or the sleeve so that the lubricating fluid is introduced into the pressure reduction preventing groove before being introduced into the thrust groove at the time of rotation of the shaft or the sleeve.

According to another aspect of the present invention, there is provided a spindle motor including: a shaft; a sleeve rotatably supporting the shaft; a thrust member installed on the shaft; and a rotor hub fixedly installed on an upper end portion of the shaft to rotate together therewith, wherein at least one of the shaft, the sleeve, the thrust member, and the rotor hub is provided with a dynamic pressure groove for generating fluid dynamic pressure at the time of rotation of the shaft, and at least one of one side of a portion of the dynamic pressure groove into which a lubricating fluid is introduced and one side of a portion of the dynamic pressure groove from which the lubricating fluid is discharged, at the time of the rotation of the shaft, is provided with a pressure reduction preventing groove for suppressing a reduction in pressure generated at the time of introduction or discharge of the lubricating fluid.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE EMBODIMENTS

Figure 1:
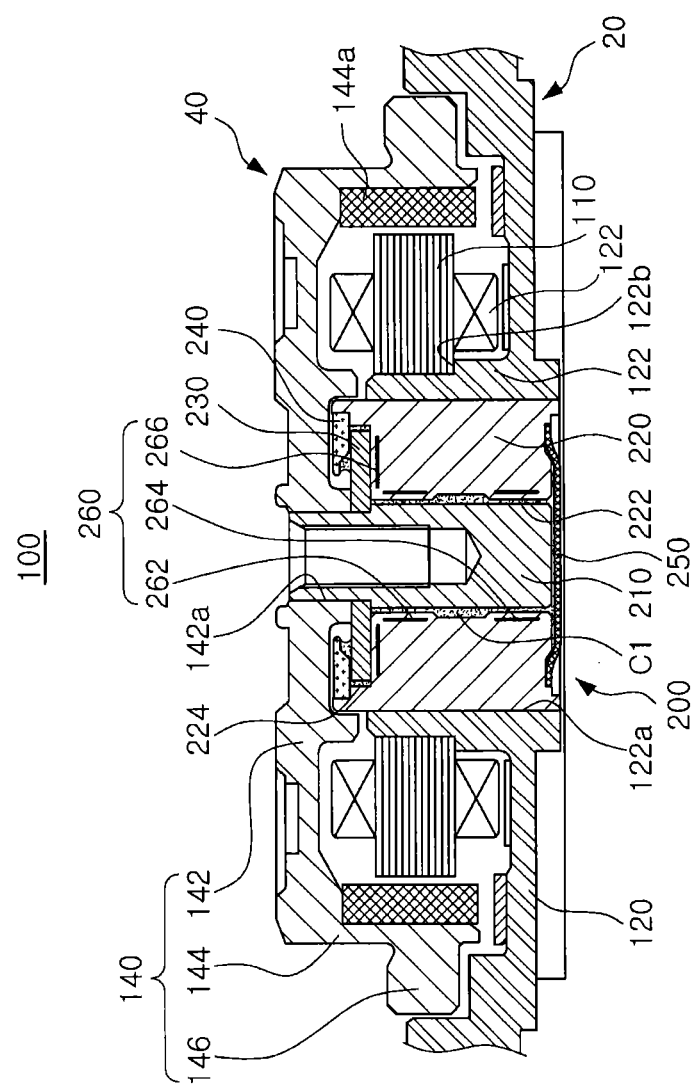
FIG. 1 is a schematic cross-sectional view showing a spindle motor including a hydrodynamic bearing assembly according to an embodiment of the present invention.

Embodiments of the present invention will now be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art. In the drawings, the shapes and dimensions of elements may be exaggerated for clarity, and the same reference numerals will be used throughout to designate the same or like elements.

Further, detailed descriptions related to well-known functions or configurations will be ruled out in order not to unnecessarily obscure subject matters of the present invention.

Figure 2:
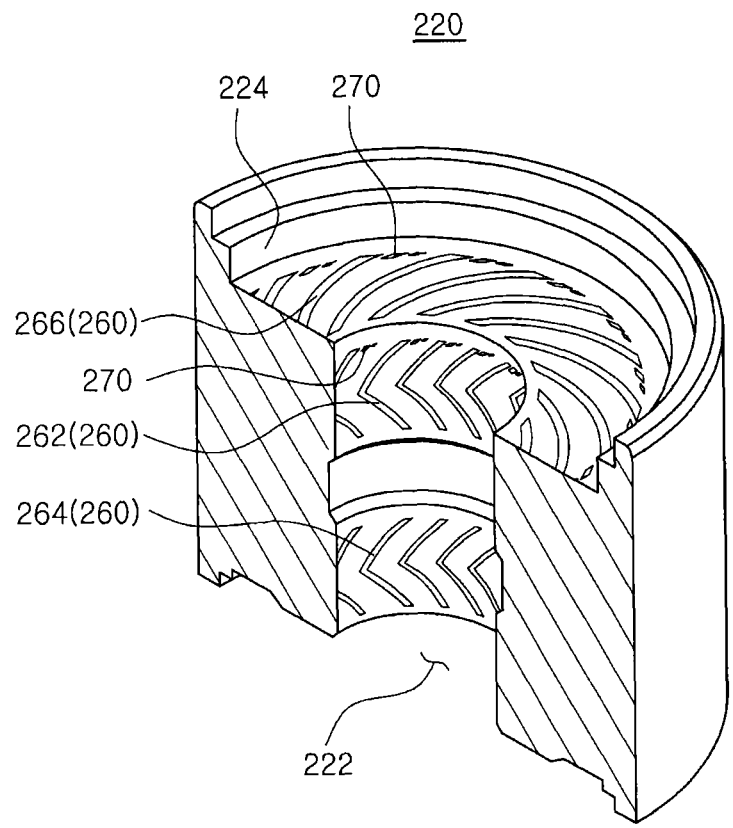
FIG. 2 is a schematic cross-sectional view showing a sleeve included in the hydrodynamic bearing assembly according to the embodiment of the present invention.
Figure 3:
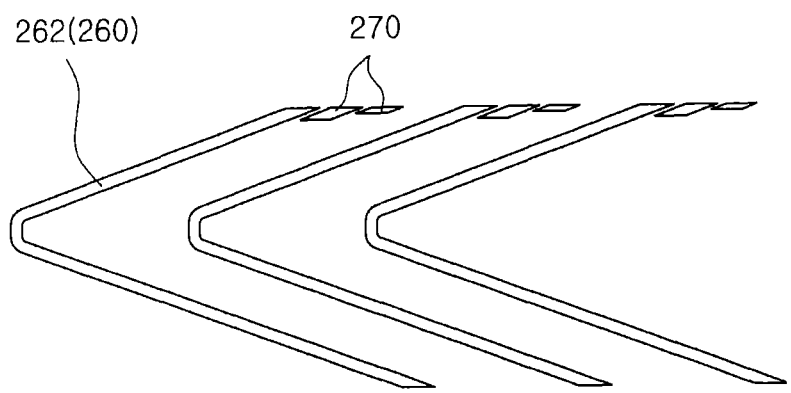
FIGS. 3 and 4 are enlarged views showing a dynamic pressure groove formed in the sleeve included in the hydrodynamic bearing assembly according to the embodiment of the present invention.
Figure 4:
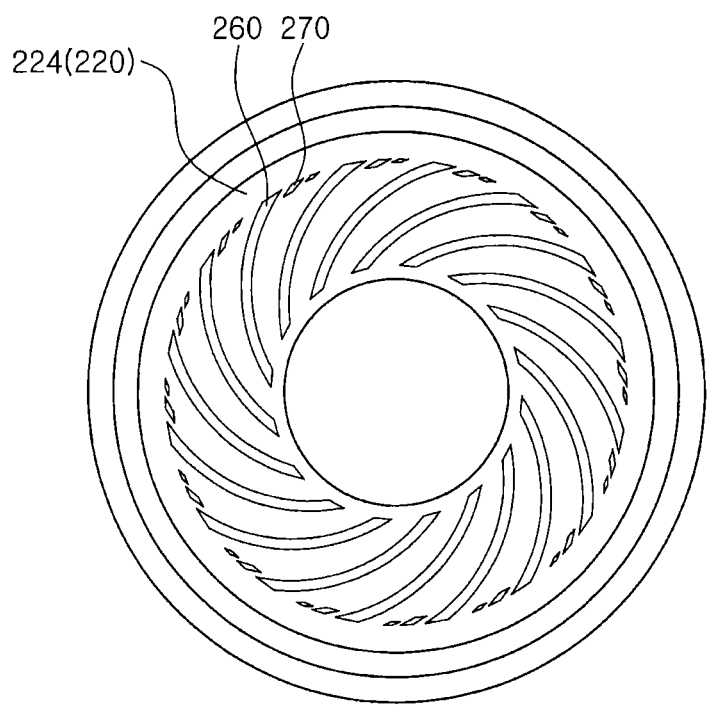
Figure 5:
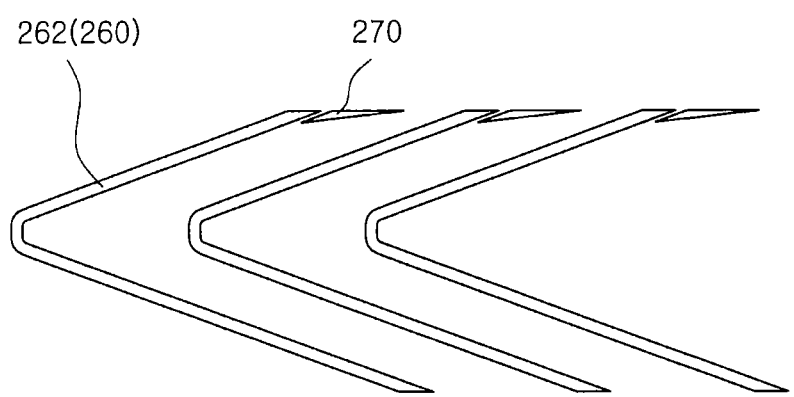
FIG. 5 is an enlarged view showing a modified example of the dynamic pressure groove formed in the sleeve included in the hydrodynamic bearing assembly according to the embodiment of the present invention.

FIG. 1 is a schematic cross-sectional view showing a spindle motor including a hydrodynamic bearing assembly according to an embodiment of the present invention; FIG. 2 is a partially cut-away perspective view showing a sleeve included in the hydrodynamic bearing assembly according to the embodiment of the present invention; FIGS. 3 and 4 are enlarged views showing a dynamic pressure groove formed in the sleeve included in the hydrodynamic bearing assembly according to the embodiment of the present invention; and FIG. 5 is an enlarged view showing a modified example of the dynamic pressure groove formed in the sleeve included in the hydrodynamic bearing assembly according to the embodiment of the present invention.

Referring to FIGS. 1 through 5, a spindle motor 100 according to the embodiment of the present invention may include a base member 120, a hydrodynamic bearing assembly 200, and a rotor hub 140, by way of example.

In addition, the hydrodynamic bearing assembly 200 may include a shaft 210, a sleeve 220, a thrust member 230, and a cap member 240.

Meanwhile, the spindle motor 100 according to the embodiment of present invention may be used in a recording disk driving device driving a recoding disk.

In addition, the spindle motor 100 according to the embodiment of the present invention may be mainly configured of a stator 20 and a rotor 40. The stator 20 indicates all fixed members rotatably supporting the rotor 40, and the rotor 40 refers to a rotating member rotating in a state in which it is supported by the stator 20.

Here, terms with respect to directions will be defined. As viewed in FIG. 1, an axial direction refers to a vertical direction, that is, a direction from a lower portion of the shaft 210 toward an upper portion thereof or a direction from the upper portion of the shaft 210 toward the lower portion thereof, and a radial direction refers to a horizontal direction, that is, a direction from an outer peripheral surface of the rotor hub 140 toward the shaft 210 or a direction from the shaft 210 toward the outer peripheral surface of the rotor hub 140.

In addition, a circumferential direction refers to a rotation direction along an outer peripheral direction of the rotor hub 140 and the shaft 210.

The base member 120, a fixed member rotatably supporting the rotor 40, may configure the stator 20. In addition, the base member 120 may include an installation part 122 having the sleeve 220 fixedly installed thereon.

The installation part 122 may protrude in an upward axial direction and include an installation hole 122a formed therein so that the sleeve 220 may be inserted thereinto. That is, the sleeve 220 may be fixedly installed on the installation part 122.

Meanwhile, the installation part 122 may include a step part 122b provided on an outer peripheral surface thereof so that a stator core 110 is insertedly fixed thereto. That is, the stator core 110 may be fixedly installed on the installation part 122 in a state in which it is seated on the step part 122b formed on the outer peripheral surface of the installation part 122.

The hydrodynamic bearing assembly 200 may serve to pump a lubricating fluid, thereby generating fluid dynamic pressure. A detailed description of the hydrodynamic bearing assembly 200 will be provided below.

The rotor hub 140 may be fixedly installed on the shaft 210 to rotate therewith. That is, the rotor hub 150, a rotating member rotating together with the shaft 140, may configure the rotor 40 and be fixedly installed on an upper end portion of the shaft 210.

Meanwhile, the rotor hub 140 may include a disk shaped body 142 provided with an mounting hole 142a through which the shaft 210 penetrates, a magnet installation part 144 extended from an edge of the body 142 in a downward axial direction, and a disk seating part 146 extended from a distal end of the magnet installation part 144 in an outer radial direction.

That is, the rotor hub 140 may have a cup shape and form an internal space together with the base member 120. In addition, the stator core 110 may be disposed in the internal space formed by the rotor hub 140 and the base member 120.

In addition, the magnet installation part 144 may have a driving magnet 144a fixedly installed thereon. That is, the driving magnet 144a may be fixedly installed on an inner peripheral surface of the magnet installation part 144 so as to be disposed to face a front end of the stator core 110.

In addition, the driving magnet 144a may have an annular ring shape and be a permanent magnet generating magnetic force having a predetermined strength by alternately magnetizing an N pole and an S pole in the circumferential direction. That is, the driving magnet 144a may serve to generate driving force for rotating the rotor hub 140.

In other words, when power is applied to a coil 112 wound around the stator core 110, force capable of rotating the rotor hub 140 by electromagnetic interaction between the stator core 100 having the coil 110 wound therearound and the driving magnet 144a may be generated. Therefore, the rotor hub 140 may rotate.

As a result, due to the rotation of the rotor hub 140, the shaft 210 and the thrust member 230 fixedly installed on the shaft 210 may rotate together with the rotor hub 140.

As described above, when the rotor hub 140 rotates, the lubricating fluid filling the hydrodynamic bearing assembly 200 may be pumped, thereby generating the fluid dynamic pressure.

Hereinafter, the hydrodynamic bearing assembly 200 will be described in more detail.

The shaft 210 may be a rotating member rotating in a state in which it is rotatably supported by the stator 20 and configuring the rotor 40. That is, the shaft 210 may be rotatably supported by the sleeve 220.

In addition, the sleeve 220 may be a fixed member configuring the stator 20 together with the base member 120 and rotatably supporting the rotor 40. In addition, the sleeve 220 may be fixedly installed on the installation part 122, as described above. In addition, the sleeve 220 may include a through-hole 222 formed at the center thereof, and the shaft 210 may be inserted into the through-hole 222 so as to be rotatably supported by the sleeve 220.

Meanwhile, in the case in which the shaft 210 is insertedly installed in the through-hole 222, an outer peripheral surface of the shaft 210 and an inner peripheral surface of the sleeve 220 may be disposed to be spaced apart from each other by a predetermined interval to form a bearing clearance C1 therebetween.

In addition, this bearing clearance C1 may be filled with the lubricating fluid so as to generate fluid dynamic pressure at the time of rotation of the shaft 210.

In addition, at least one of the outer peripheral surface of the shaft 210 and the inner peripheral surface of the sleeve 220 may be provided with a dynamic pressure groove 260 for generating the fluid dynamic pressure at the time of rotation of the shaft 210.

A detailed description of the dynamic pressure groove 260 will be provided below.

Meanwhile, although the present embodiment describes the case in which the shaft 210 is the rotating member and the sleeve 220 is the fixed member rotatably supporting the shaft 220 by way of example, the present invention is not limited thereto.

That is, the shaft 210 may be fixed and the sleeve 220 may rotate around the shaft 210. In other words, any one of the shaft 210 and the sleeve 220 may be a fixed member and the other thereof may be a rotating member.

The thrust member 230 may be installed on the shaft 210. In addition, the thrust member 230, a rotating member rotating together with the shaft 210, may be included in the rotor 40.

Meanwhile, the thrust member 230 may be insertedly disposed in an insertion groove 224 formed in the upper end portion of the sleeve 220.

In addition, a lower surface of the thrust member 230 and an upper surface of the sleeve 220 disposed to face the lower surface of the thrust member 230 may be provided with the dynamic pressure groove 260 for generating the fluid dynamic pressure through the lubricating fluid filling the bearing clearance C1.

Here, the dynamic pressure groove 260 will be described in more detail.

The dynamic pressure groove 260 may include upper and lower journal grooves 262 and 264 formed in at least one of the outer peripheral surface of the shaft 210 and the inner peripheral surface of the sleeve 220 and a thrust groove 266 formed in at least one of thrust member 230 and the sleeve 220.

The upper and lower journal grooves 262 and 264 may have a herringbone shape. In addition, the upper and lower journal grooves 262 and 264 may be disposed to be spaced apart from each other by a predetermined interval so as to more stably support the shaft 210.

That is, the upper and lower journal grooves 262 and 264 may serve to pump the lubricating fluid at the time of the rotation of the shaft 210 to generate the fluid dynamic pressure, thereby supporting the shaft 210 in the radial direction.

Although the present embodiment describes the case in which the upper and lower journal grooves 262 and 264 have the herringbone shape by way of example, the present invention is not limited thereto. That is, the upper and lower journal grooves 262 and 264 may also have a spiral shape.

In addition, although the present embodiment describes the case in which the upper and lower journal grooves 262 and 264 are formed in the inner peripheral surface of the sleeve 220 by way of example, the present invention is not limited thereto. That is, the upper and lower journal grooves 262 and 264 may also be formed in the outer peripheral surface of the shaft 210.

The thrust groove 266 may be formed in a lower surface of the thrust member 230 or a bottom surface of the insertion groove 224 of the sleeve 220 disposed to face the lower surface of the thrust member 230 and have a spiral shape.

In addition, the thrust groove 266 may serve to pump the lubricating fluid at the time of the rotation of the shaft 210 to generate the fluid dynamic pressure, thereby supporting the thrust member 230 in the axial direction.

Meanwhile, although the present embodiment describes the case in which the thrust groove 266 has the spiral shape by way of example, the present invention is not limited thereto. That is, the thrust groove 266 may also have a herringbone shape.

In addition, although the present embodiment describes the case in which the thrust groove 266 is formed in the sleeve 220 by way of example, the present invention is not limited thereto. That is, the thrust groove 266 may also be formed in the lower surface of the thrust member 230.

Meanwhile, one side of a portion of the dynamic pressure groove 260 into which the lubricating fluid is introduced may be provided with a pressure reduction preventing groove 270 in order to suppress pressure reduction generated at the time of introduction of the lubricating fluid.

The pressure reduction preventing groove 270 may be disposed to one side of a distal end portion of the upper or lower journal groove 262 or 264 in a direction opposite to a rotation direction of the shaft 210 so that the lubricating fluid is introduced into the pressure reduction preventing groove 270 before being introduced into the upper and lower journal grooves 262 and 264.

Meanwhile, although the present embodiment describes the case in which the pressure reduction preventing groove 270 is formed at one side of a distal end portion of the upper journal groove 262 by way of example, the present invention is not limited thereto. That is, the pressure reduction preventing groove 270 may also be formed at one side of a distal end portion of the lower journal groove 264.

An operation of the pressure reduction preventing groove 270 will be described in more detail. At the time of the rotation of the shaft 210, the lubricating fluid may be introduced from the outside of the upper journal groove 262 into the upper journal groove 262.

Meanwhile, in the case in which the pressure reduction preventing groove 270 is not formed, pressure at a portion of the upper journal groove 262 into which the lubricating fluid is introduced may be rapidly reduced. Therefore, cavitation may be generated in the bearing clearance. That is, the pressure at the portion of the upper journal groove 262 into which the lubricating fluid is introduced may be rapidly reduced, thereby generating air bubbles.

However, at the time of the rotation of the shaft 210, the lubricating fluid may be introduced into the pressure reduction preventing groove 270 and then introduced into the upper journal groove 262, whereby a rapid reduction in pressure at a location at which the lubricating fluid is introduced into the upper journal groove 262 may be suppressed.

That is, the pressure is sequentially reduced, whereby rapid reduction in the pressure at the distal end portion of the upper journal groove 262 may be suppressed.

In addition, a plurality of pressure reduction preventing grooves 270 may be disposed to be spaced apart from each other in the direction opposite to the rotation direction of the shaft 210. Therefore, the pressure may be more sequentially reduced, whereby the rapid reduction in the pressure at the distal end portion of the upper journal groove 262 may be suppressed.

That is, the pressure at the distal end portion of the upper journal groove 262 may increase as compared to the case in which the pressure reduction preventing groove 270 is not provided.

Therefore, the occurrence of cavitation may be further suppressed.

Here, a location and a shape of the pressure reduction preventing groove 270 will be described in more detail.

First, the distal end of the pressure reduction preventing groove 270 and the distal end of the upper journal groove 262 may be commonly disposed on an extension line extended from the distal end portion of the upper journal groove 262 in the circumferential direction.

In addition, the pressure reduction preventing groove 270 may be disposed in parallel with the upper journal groove 262. That is, the pressure reduction preventing groove 270 may be inclined at a predetermined angle.

In addition, in the case in which the plurality of pressure reduction preventing grooves 270 are formed, they may decrease in size in a direction away from the upper journal groove 262.

In addition, as shown in FIG. 5, both distal ends of the pressure reduction preventing groove 270 may have acute distal ends and widen in a central portion thereof.

In addition, both distal ends of the pressure reduction preventing groove 270 may have a shape equal to or more acute than that of the distal end of the upper journal groove 262.

As described above, at the time of the rotation of the shaft 210, the lubricating fluid is introduced into the pressure reduction preventing groove 270 and then introduced into the upper journal groove 262, whereby the reduction of pressure at the distal end portion of the upper journal groove 262 may be further suppressed.

In addition, the pressure reduction preventing groove 270 is formed to have the above-described shape, whereby the reduction of pressure at the distal end portion of the upper journal groove 262 may be further suppressed.

Meanwhile, the pressure reduction preventing grooves 270 may be formed at one side of the end of the thrust groove 266. That is, at the time of the rotation of the shaft 210, the pressure reduction preventing groove 270 may be disposed to one side of the distal end portion of the thrust groove 266 in the direction opposite to the rotation direction of the shaft 210 so that the lubricating fluid may first be introduced into the pressure reduction preventing groove 270 before being introduced into the thrust groove 266.

That is, at the time of the rotation of the shaft 210, the lubricating fluid may be introduced from the outside of the thrust groove 266 into the thrust groove 266.

Meanwhile, in the case in which the pressure reduction preventing groove 270 is not formed, pressure at a portion of the thrust groove 266 into which the lubricating fluid is introduced may be rapidly reduced. Therefore, cavitation may be generated in the bearing clearance. That is, the pressure at the portion of the thrust groove 266 into which the lubricating fluid is introduced may be rapidly reduced, thereby generating air bubbles.

However, at the time of rotation of the shaft 210, the lubricating fluid is introduced into the pressure reduction preventing groove 270 and then introduced into the thrust groove 266, whereby the rapid reduction in the pressure at the portion of the thrust groove 266 into which the lubricating fluid is introduced may be suppressed.

That is, the pressure is sequentially reduced, whereby the rapid reduction in the pressure at the distal end portion of the thrust groove 266 may be suppressed.

In addition, the plurality of pressure reduction preventing grooves 270 may be disposed to be spaced apart from each other in the direction opposite to the rotation direction of the shaft 210. Therefore, the pressure may be more sequentially reduced, whereby the rapid reduction in the pressure at the distal end portion of the thrust groove 266 may be suppressed.

That is, the pressure at the distal end portion of the thrust groove 266 may increase as compared to the case in which the pressure reduction preventing groove 270 is not provided.

Therefore, the occurrence of cavitation may be further suppressed.

The cap member 240 may be installed on the sleeve 220 so as to be disposed above the thrust member 230 and serve to form a liquid-vapor interface together with the thrust member 230.

In addition, a cover member 250 may be installed at a lower end portion of the sleeve 220 in order to prevent the lubricating fluid from being leaked.

As described above, pressure reduction at locations at which the lubricating fluid is introduced into the upper journal groove 262 and the thrust groove 266 is suppressed through the pressure reduction preventing groove 270, whereby the generation of air bubbles may be reduced.

Hereinafter, a hydrodynamic bearing assembly and a spindle motor having the same according to another embodiment of the present invention will be described with reference to FIGS. 6 through 9. However, a detailed description of the same components as the above-mentioned components will be omitted and be replaced by the above-mentioned description.

Figure 6:
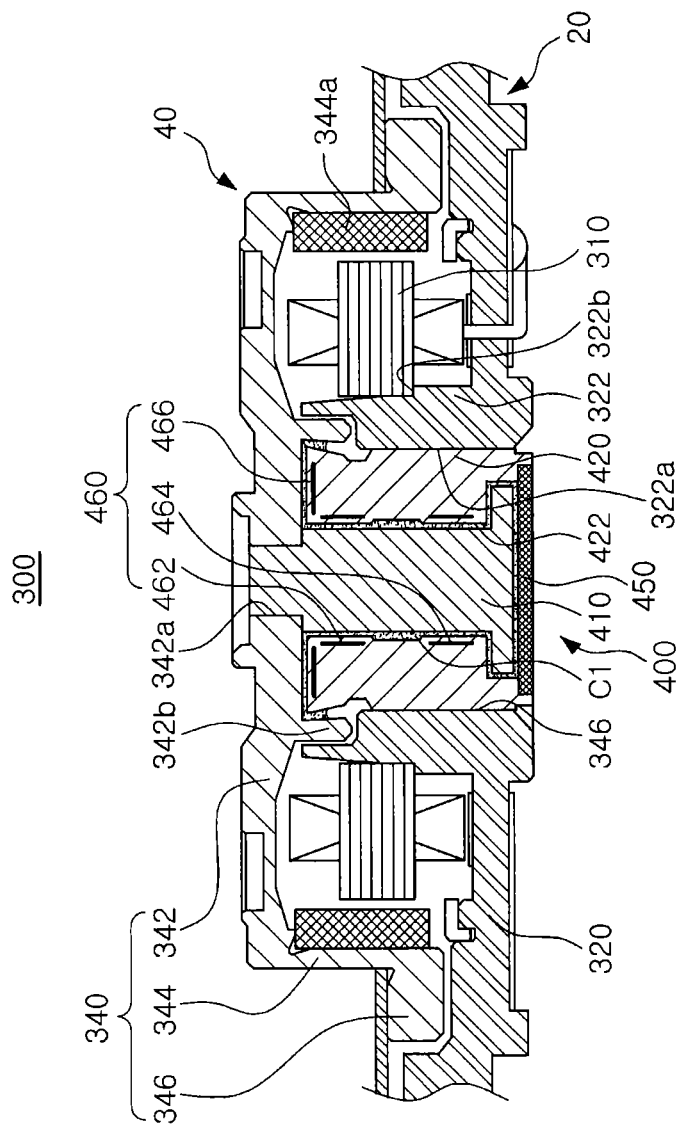
FIG. 6 is a schematic cross-sectional view showing a spindle motor including a hydrodynamic bearing assembly according to another embodiment of the present invention.
Figure 7:
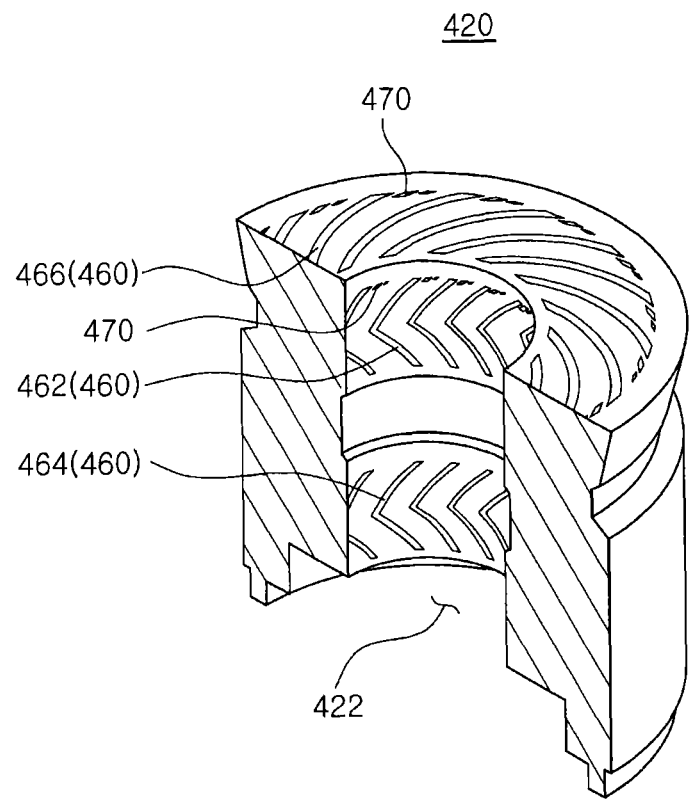
FIG. 7 is a schematic cross-sectional view showing a sleeve included in the hydrodynamic bearing assembly according to another embodiment of the present invention.
Figure 8:
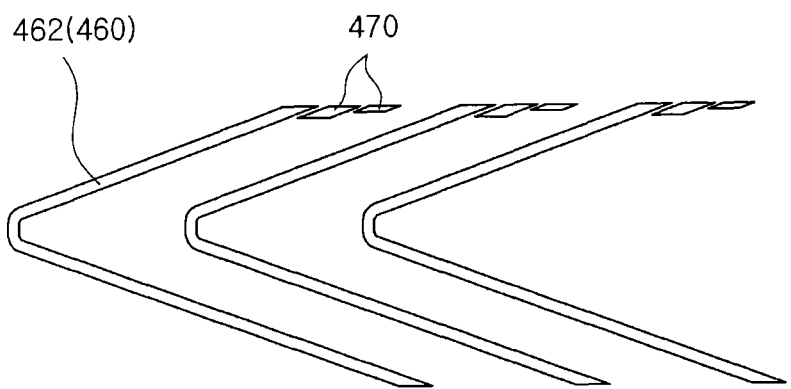
FIGS. 8 and 9 are enlarged views showing a dynamic pressure groove formed in the sleeve included in the hydrodynamic bearing assembly according to another embodiment of the present invention.
Figure 9:
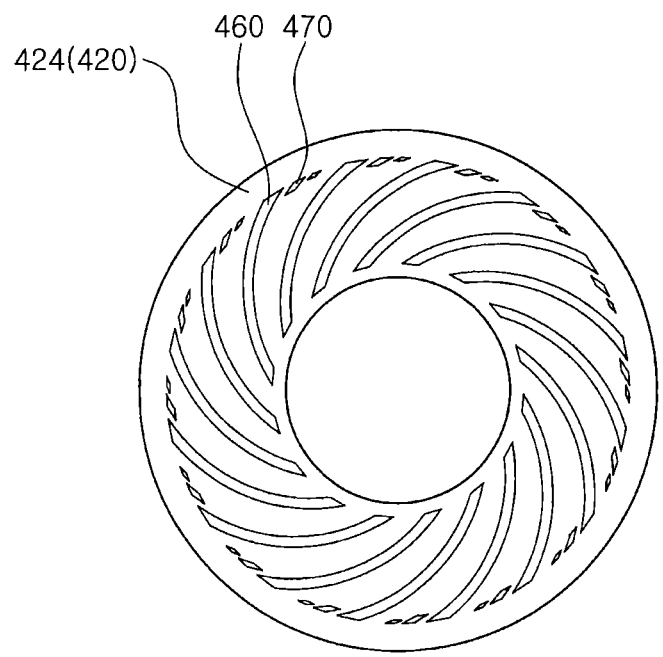

FIG. 6 is a schematic cross-sectional view showing a spindle motor including a hydrodynamic bearing assembly according to another embodiment of the present invention;

FIG. 7 is a partially cut-away perspective view showing a sleeve included in the hydrodynamic bearing assembly according to another embodiment of the present invention;

and FIGS. 8 and 9 are enlarged views showing a dynamic pressure groove formed in the sleeve included in the hydrodynamic bearing assembly according to another embodiment of the present invention.

Referring to FIGS. 6 through 9, a spindle motor 300 according to another embodiment of the present invention may include a base member 320, a hydrodynamic bearing assembly 400, and a rotor hub 340 by way of example.

In addition, the hydrodynamic bearing assembly 400 may include a shaft 410, a sleeve 420, and a cover member 450.

Meanwhile, since the base member 320 included in the spindle motor 300 according to this embodiment of the present invention has the same configuration as that of the base member 120 included in the spindle motor 100 according to the previous embodiment of the present invention, a detailed description thereof will be omitted.

In addition, the hydrodynamic bearing assembly 400 according to the present embodiment of the present invention is different from the hydrodynamic bearing assembly 200 according the previous embodiment of the present invention in that it does not include the thrust member 230 included in the spindle motor 100. The dynamic pressure groove 260 and the pressure reduction preventing groove 270 of the hydrodynamic bearing assembly 200 according to the embodiment of the present invention are also included in the hydrodynamic bearing assembly 400 included in the spindle motor 300 according to this embodiment of the present invention. Therefore, a detailed description of a dynamic pressure groove 460 and a pressure reduction preventing groove 470 will be omitted.

The rotor hub 340 may be fixedly installed on the shaft 410 to rotate therewith. That is, the rotor hub 340, a rotating member rotating together with the shaft 340, may configure the rotor 40 and be fixedly installed on an upper end portion of the shaft 410.

Meanwhile, the rotor hub 340 may include a disk shaped body 342 provided with an mounting hole 342a through which the shaft 210 penetrates, a magnet installation part 344 extended from an edge of the body 342 in a downward axial direction, and a disk seating part 346 extended from a distal end of the magnet installation part 144 in an outer radial direction.

That is, the rotor hub 340 may have a cup shape and form an internal space together with the base member 320. In addition, a stator core 310 may be disposed in the internal space formed by the rotor hub 340 and the base member 320.

In addition, the body 342 may include an extension wall part 342b for forming a liquid-vapor interface together with the sleeve 420 included in the hydrodynamic bearing assembly 400.

In addition, a thrust groove 466 included in the dynamic pressure groove 460 may be formed in at least one of a lower surface of the body 342 of the rotor hub 340 and an upper surface of the sleeve 420.

Meanwhile, since the magnet installation part 344 and the disk seating part 346 included in the rotor hub 340 are the same as the corresponding components of the rotor hub 140 as described above, a detailed description thereof will be omitted.

As set forth above, according to embodiments of the present invention, pressure reduction generated at a portion of a dynamic pressure groove into which a lubricating fluid is introduced is suppressed through a pressure reduction preventing groove, whereby the generation of air bubbles may be reduced.

While the present invention has been shown and described in connection with the embodiments, it will be apparent to those skilled in the art that modifications and variations can be made without departing from the spirit and scope of the invention as defined by the appended claims.

What is claimed is:

1. A hydrodynamic bearing assembly comprising:
   a shaft;
   a sleeve disposed to be spaced apart from the shaft by a predetermined interval to form a bearing clearance therewith; and
   a thrust member installed on the shaft,
   wherein at least one of the shaft, the sleeve, and the thrust member is provided with a dynamic pressure groove for generating fluid dynamic pressure in a lubricating fluid provided in the bearing clearance,
   one side of a portion of the dynamic pressure groove into which the lubricating fluid is introduced is provided with a pressure reduction preventing groove for suppressing a reduction in pressure generated at the time of introduction of the lubricating fluid,
   the dynamic pressure groove includes upper and lower journal grooves formed in at least one of an outer peripheral surface of the shaft and an inner peripheral surface of the sleeve,
   the upper and lower journal grooves have a herringbone or spiral shape,
   the pressure reduction preventing groove is disposed to one side of a distal end portion of at least one of the upper and lower journal grooves in a direction opposite to a rotation direction of the shaft or the sleeve so that the lubricating fluid is introduced into the pressure reduction preventing groove before being introduced into the upper and lower journal grooves,
   the pressure reduction preventing groove comprises one or more pressure reduction preventing grooves disposed to be spaced apart from each other in the direction opposite to the rotation direction of the shaft or the sleeve, and
   the one or more pressure reduction preventing grooves decrease in size in a direction away from the upper and lower journal grooves.

2. The hydrodynamic bearing assembly of claim 1, wherein one end of the pressure reduction preventing groove and one end of the upper and lower journal grooves are commonly disposed on an extension line extended from one end of the upper and lower journal grooves in a circumferential direction.

3. The hydrodynamic bearing assembly of claim 1, wherein the pressure reduction preventing groove is disposed in parallel with the upper and lower journal grooves.

4. The hydrodynamic bearing assembly of claim 1, wherein the dynamic pressure groove includes a thrust groove providing force in an axial direction, the thrust groove being formed in at least one of the thrust member and the sleeve.

5. The hydrodynamic bearing assembly of claim 4, wherein the thrust groove has a herringbone or spiral shape, and
   the pressure reduction preventing groove is disposed to one side of a distal end portion of the thrust groove in a direction opposite to a rotation direction of the shaft or the sleeve so that the lubricating fluid is introduced into the pressure reduction preventing groove before being introduced into the thrust groove at the time of rotation of the shaft or the sleeve.

6. A hydrodynamic bearing assembly comprising:
   a shaft;
   a sleeve disposed to be spaced apart from the shaft by a predetermined interval to form a bearing clearance therewith; and
   a thrust member installed on the shaft, wherein at least one of the shaft, the sleeve, and the thrust member is provided with a dynamic pressure groove for generating fluid dynamic pressure in a lubricating fluid provided in the bearing clearance, one side of a portion of the dynamic pressure groove into which the lubricating fluid is introduced is provided with a pressure reduction preventing groove for suppressing a reduction in pressure generated at the time of introduction of the lubricating fluid, the dynamic pressure groove includes upper and lower journal grooves formed in at least one of an outer peripheral surface of the shaft and an inner peripheral surface of the sleeve, the upper and lower journal grooves have a herringbone or spiral shape, the pressure reduction preventing groove is disposed to one side of a distal end portion of at least one of the upper and lower journal grooves in a direction opposite to a rotation direction of the shaft or the sleeve so that the lubricating fluid is introduced into the pressure reduction preventing groove before being introduced into the upper and lower journal grooves, the pressure reduction preventing groove comprises one or more pressure reduction preventing grooves disposed to be spaced apart from each other in the direction opposite to the rotation direction of the shaft or the sleeve, and the pressure reduction preventing groove has acute distal ends and widens in a central portion thereof.

7. A spindle motor comprising:
a shaft;
a sleeve rotatably supporting the shaft;
a thrust member installed on the shaft; and
a rotor hub fixedly installed on an upper end portion of the shaft to rotate together therewith, wherein at least one of the shaft, the sleeve, the thrust member, and the rotor hub is provided with a dynamic pressure groove for generating fluid dynamic pressure at the time of rotation of the shaft, at least one of one side of a portion of the dynamic pressure groove into which a lubricating fluid is introduced and one side of a portion of the dynamic pressure groove from which the lubricating fluid is discharged, at the time of the rotation of the shaft, is provided with a pressure reduction preventing groove for suppressing a reduction in pressure generated at the time of introduction or discharge of the lubricating fluid, the dynamic pressure groove includes upper and lower journal grooves formed in at least one of an outer peripheral surface of the shaft and an inner peripheral surface of the sleeve, the upper and lower journal grooves have a herringbone or spiral shape, the pressure reduction preventing groove is disposed to one side of a distal end portion of at least one of the upper and lower journal grooves in a direction opposite to a rotation direction of the shaft or the sleeve so that the lubricating fluid is introduced into the pressure reduction preventing groove before being introduced into the upper and lower journal grooves, the pressure reduction preventing groove comprises one or more pressure reduction preventing grooves disposed to be spaced apart from each other in the direction opposite to the rotation direction of the shaft or the sleeve, and the one or more pressure reduction preventing grooves decrease in size in a direction away from the upper and lower journal grooves.

\* \* \* \* \*